(12) United States Patent
Regalado et al.

(10) Patent No.: US 8,443,814 B2
(45) Date of Patent: *May 21, 2013

(54) FLEXIBLE LEVEL SYSTEM FOR A COMB

(75) Inventors: Jose Joaquin Regalado, San Clemente, CA (US); Fedrico Hormozi, Aliso Viejo, CA (US)

(73) Assignee: HSE Partners, LLC, Aliso Viego, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/565,456

(22) Filed: Sep. 23, 2009

(65) Prior Publication Data

US 2010/0101596 A1   Apr. 29, 2010

Related U.S. Application Data

(60) Provisional application No. 61/099,466, filed on Sep. 23, 2008.

(51) Int. Cl.
*A45D 24/10* (2006.01)
(52) U.S. Cl.
USPC ........................................................ 132/148
(58) Field of Classification Search
USPC ......... 132/213.1, 148, 218, 213, 214; 33/334, 33/347
See application file for complete search history.

(56) References Cited

U.S. PATENT DOCUMENTS

| | | | |
|---|---|---|---|
| 1,239,951 A * | 9/1917 | Peckham | 132/148 |
| 2,879,777 A | 3/1959 | Miller et al. | |
| 3,134,382 A * | 5/1964 | Broman | 132/213.1 |
| 3,820,249 A * | 6/1974 | Stone | 33/347 |
| 3,832,782 A * | 9/1974 | Johnson et al. | 33/451 |
| 4,295,279 A | 10/1981 | Sienknecht | |
| 4,368,745 A | 1/1983 | McGuffey | |
| 4,457,078 A | 7/1984 | Suchy | |
| 4,517,998 A * | 5/1985 | Furco | 132/148 |
| D283,057 S | 3/1986 | Rogers | |
| 4,785,544 A | 11/1988 | Heinsius et al. | |
| 4,830,031 A | 5/1989 | Quinones et al. | |
| 4,905,717 A * | 3/1990 | Taylor et al. | 132/148 |
| 5,063,697 A | 11/1991 | Valente et al. | |
| 5,456,273 A * | 10/1995 | Tungpagasit | 132/213.1 |
| D405,227 S | 2/1999 | Lucero | |
| D405,228 S | 2/1999 | Lucero | |
| D406,391 S | 3/1999 | Lucero | |
| D428,529 S | 7/2000 | Lucero | |
| D428,669 S | 7/2000 | Lucero | |
| 6,463,666 B1 * | 10/2002 | Szumer | 33/484 |
| 6,785,977 B1 * | 9/2004 | Crichton | 33/613 |
| 2005/0011531 A1 * | 1/2005 | Gers | 132/213.1 |
| 2007/0023063 A1 * | 2/2007 | Deuel | 132/213.1 |
| 2008/0078418 A1 * | 4/2008 | Ghoorchian | 132/213.1 |

* cited by examiner

*Primary Examiner* — Robyn Doan
(74) *Attorney, Agent, or Firm* — PatentBest; Andrew McAleavey

(57) ABSTRACT

A comb system for creating or replicating a haircut. The comb system has a comb that measures different angles via level and measuring attachments that can be affixed or movable about the comb so user can select the desired angle for an accurate cut.

30 Claims, 4 Drawing Sheets

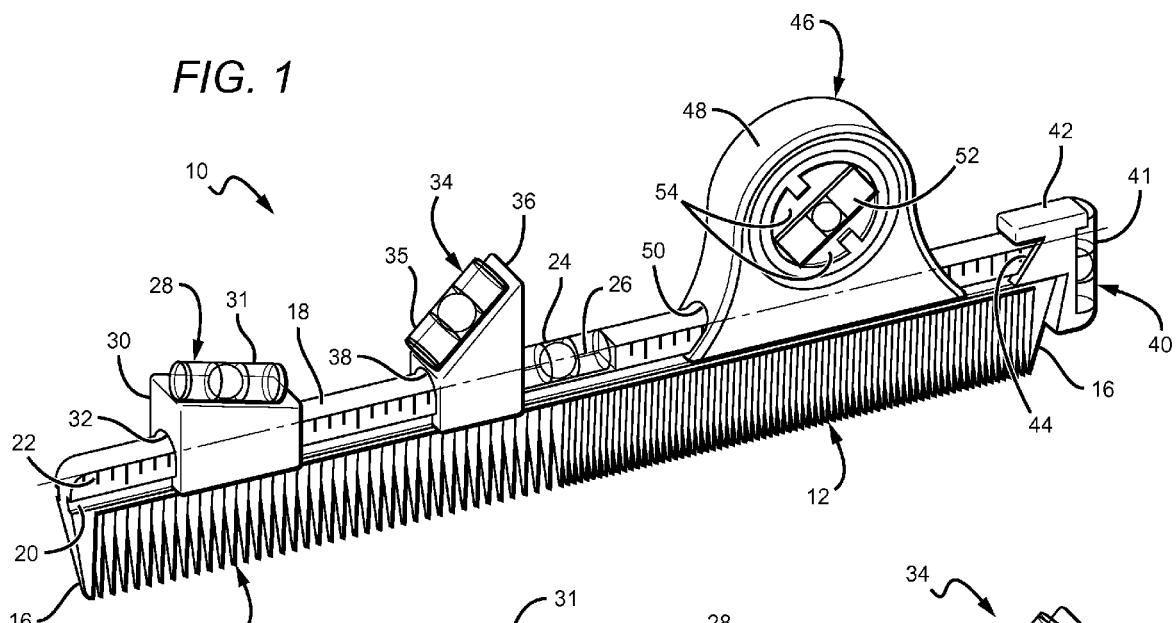
FIG. 1
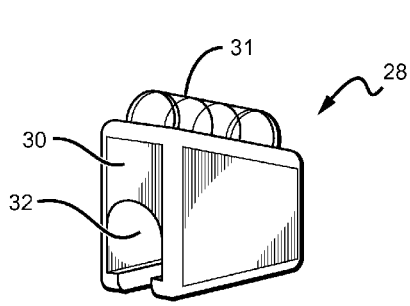
FIG. 2A
FIG. 2B

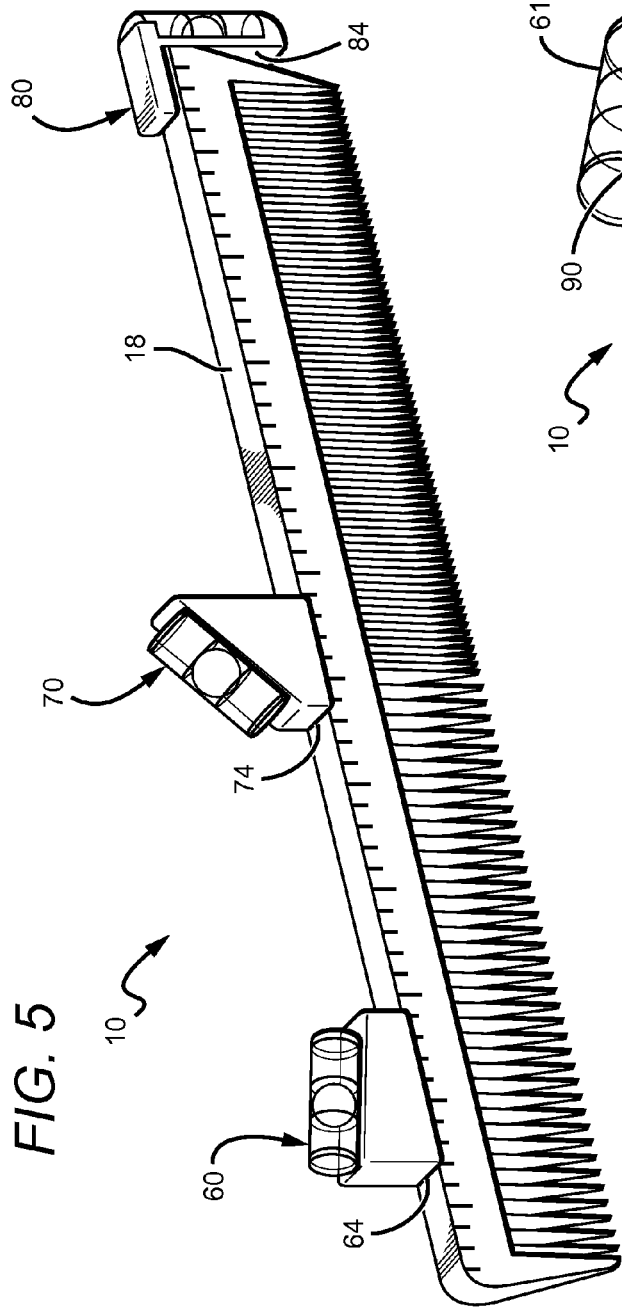
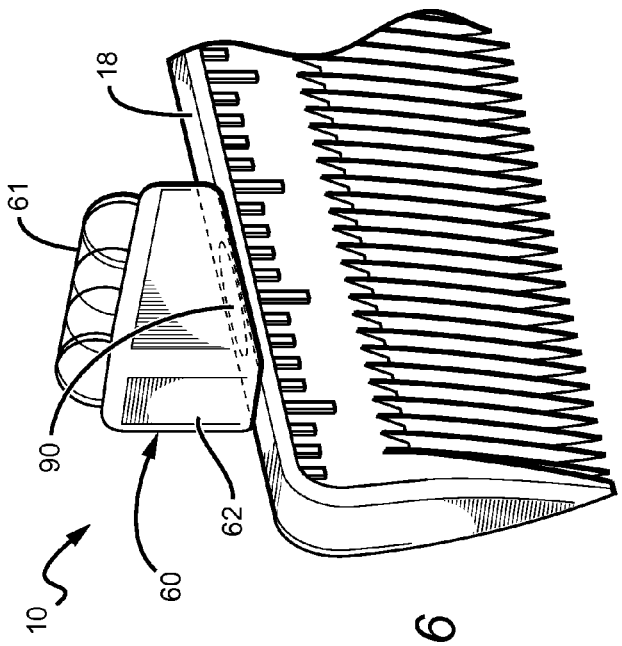

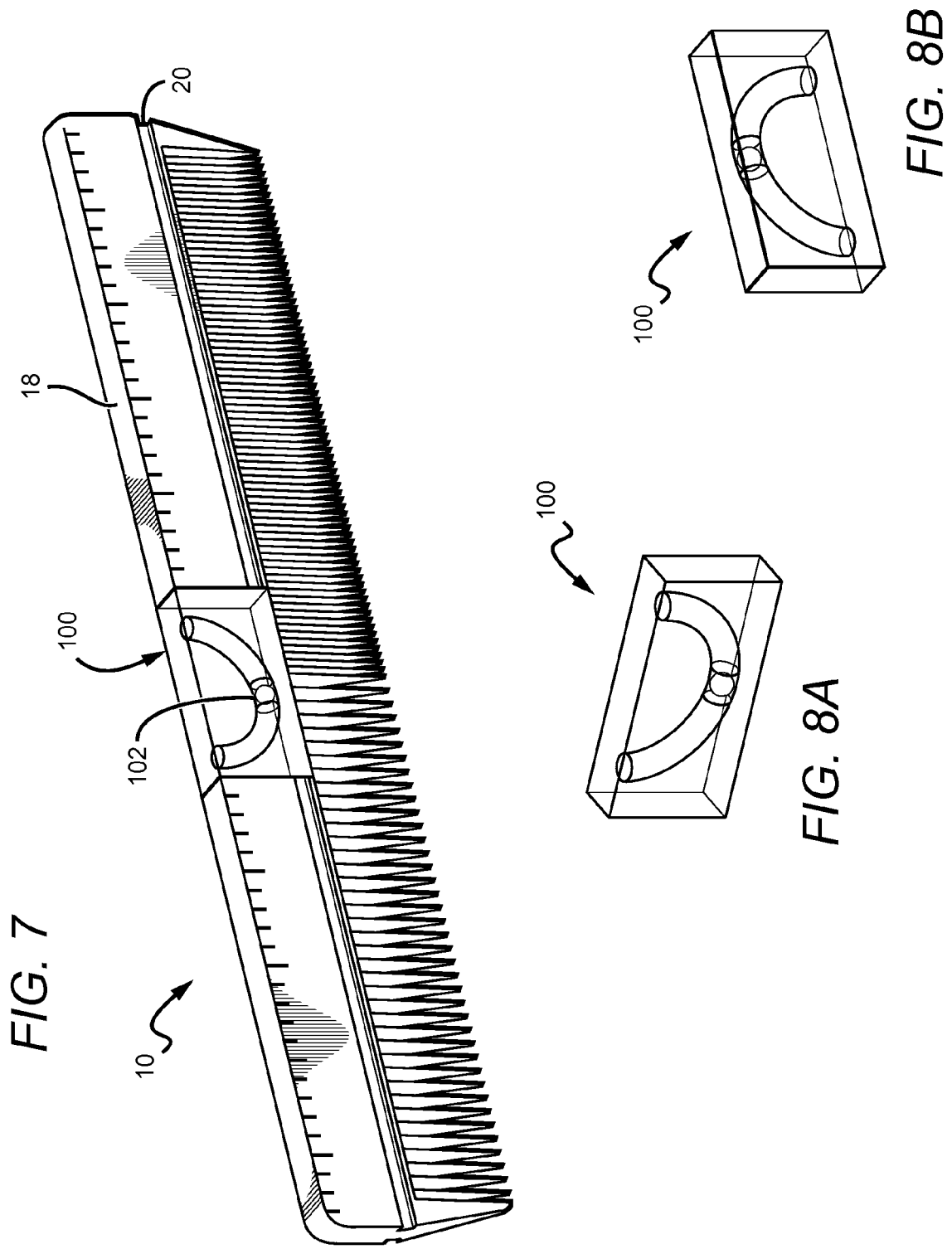

FLEXIBLE LEVEL SYSTEM FOR A COMB

This application claims priority to U.S. provisional application Ser. No. 61/099466 filed Sep. 23, 2008.

FIELD OF THE INVENTION

The field of the invention relates to a flexible level system for use with a comb for aiding in the cutting of hair at specific angles.

BACKGROUND

Everyone needs a haircut yet this seemingly simple act is quite complicated. Not only is everyone's hair texture, head shape, hair direction and needs different, but the common tools available to today's hair stylists are quite limiting. Combs, razors, and scissors are the staples of a hairstylist's arsenal and yet they have remained the same for decades, if not for centuries. A brilliant cut can involve angles that are difficult to replicate and making the process to achieve error-free "perfection" laborious and time consuming. Thus, brilliant haircuts are limited to those who have practiced for years or that have an innate sense of how it works or simply a random luck of the draw.

Numerous comb designs have include a level or a measuring device within the structure of the comb. See U.S. Pat. No. 2,879,777 to Miller et al.; U.S. Des. No. 428,529 to Lucero; U.S. Des. No. 428,669 to Lucero; U.S. Des. No. 406,391 to Lucero; U.S. Des. No. 405,228 to Lucero; U.S. Des. No. 405,227 to Lucero; U.S. Des. No. 283,057 to Rogers U.S. Pat. No. 4,368,745 to McGuffey. However, these fixed levels are limiting because they can only measure one particular angel at a time.

Improvements have been made to combs to measure more than one angle. See U.S. Pat. No. 4,517,998 to Furco; U.S. Publ. No. 2008/0078418 to Ghoorchian. However, these levels are permanently affixed to the comb and can only measure a limiting amount of angles. Furthermore, a person's head is a three dimensional object in which measurement of one direction is not enough to obtain a desired angle and cut.

Others have taken the three dimensional scale of a head into consideration. However, the ball level as disclosed in U.S. Publ. No. 2007/0023063 to Deuel can give a consideration of different degrees in different axis, but it is hard to manipulate the ball level for accurate reading. The level in U.S. Publ. No. 2005/0011531 to Gers also proves to be impractical as the angle dial sits perpendicular to the comb and is inflexible.

Thus, there exists a need for a system in which different angles can be obtained quickly and easily to facilitate a specific angled haircut. There also exist a need for a comb so replicating or teaching a particular cut can be done more accurately and efficiently.

SUMMARY OF THE INVENTION

The present inventive subject matter provides a system that includes a comb with a toothed portion, a handle portion and a number of removable level attachments placed along the toothed portion.

In a preferred embodiment, the comb handle has a groove in which different level attachment can engage the groove along the comb for a reading of different angle measurements. Preferred level attachments have a bubble level that is set at 15°, 45° and 90°. Yet another preferred level attachment includes a rotary dial unit that can read any angle ranging from 1° to 180°. It is also contemplated that a number of fixed levels can be integrated along the comb.

The level attachments preferably are situated in a level housing that contains a cylindrical bubble level. Furthermore, the level attachments are preferably engaged along a groove of the comb, but can be attached via other means such as an adhesive attached to the bottom of the level attachments. It is also contemplated that the level attachment can be engaged in a separate adapter that can be used with existing combs that are without a groove or it can be used on its own or with other instruments.

It is also preferred that a measuring device can be either affixed to a comb or movable along the comb to measure different angles. Once a desired angle is determined, then a corresponding level attachment can be selected and used on the comb.

Yet preferably, there exists a kit that contains a comb, a set of level attachments for measuring various angles that are coupled to the comb and an instruction booklet as to how to use the comb for cutting hair.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 1 is a perspective view of a comb system implementing the present inventive subject matter.

FIGS. 2A, 2B, 2C are close-up view of various level attachments embodying the present inventive subject matter.

FIG. 5 is a perspective view of another preferred implementation of a comb system embodying the present inventive subject matter.

FIG. 6 is a close-up view of FIG. 5.

FIG. 7 is a perspective view of yet another preferred implementation of a comb system embodying the present inventive subject matter.

FIGS. 8A and 8B are close-up view of a measuring level.

DETAILED DESCRIPTION

Figure 4:
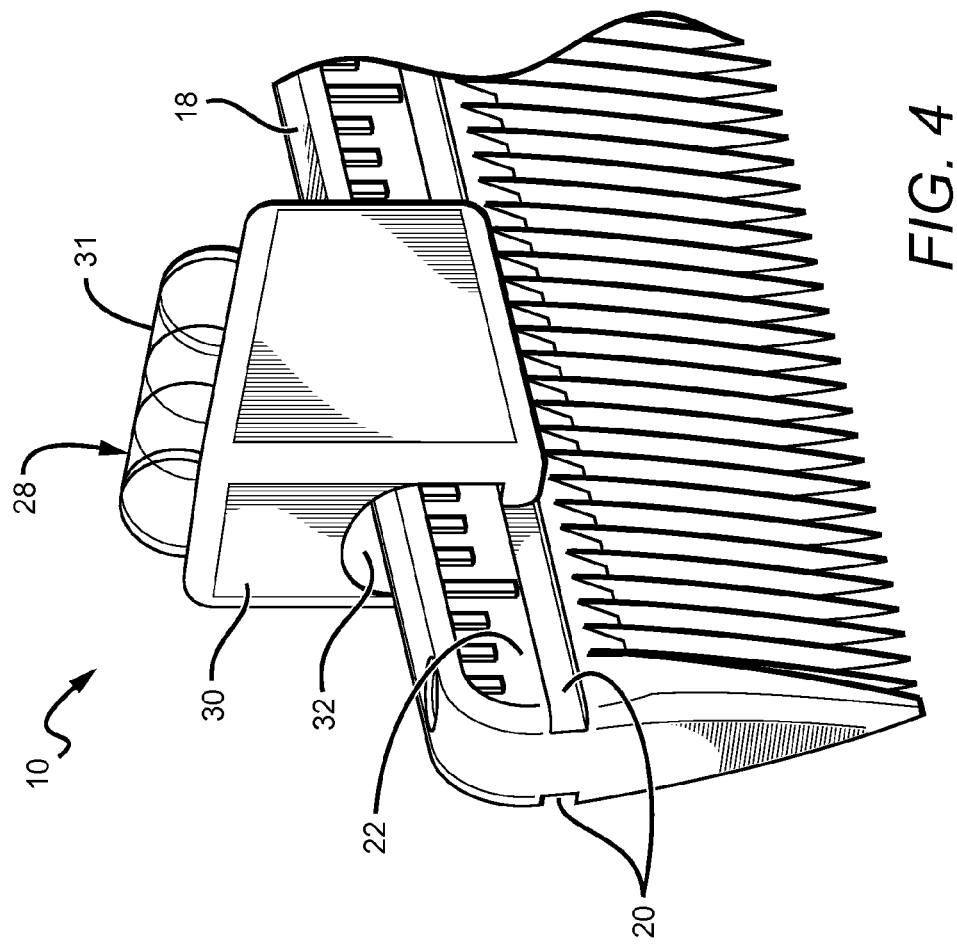
FIG. 4 is a close-up view of FIG. 1.

As illustrated in the attached Figures, a comb is provided to guide a person to cut hair at constant varying angles. As illustrated in FIG. 1, in one implementation, a comb is provided that includes four levels for determining when the comb is positioned at various angles.

In FIG. 1, comb 10 generally includes a portion of fine teeth 12 and a portion of wide teeth 14 and back portion 18. Also along the back portion of the comb is a scale 22 for indicating the length of hair that needs to be cut. Along the scale, a fixed level 24 is affixed as part of the comb. The fixed levels may be of different angles can be incorporated along the back portion of the comb or in combs with a wide handle, can be integrated with the handle of the comb. Those skilled in the art will recognize that the fixed level can be a bubble level which includes horizontal and vertical angels ranging from 0° to 180° relative to central axis 26 of comb.

Preferably, the comb is made out of a semi-rigid moldable material such as plastic, glass reinforced resin, ABS, and polystyrene. The teeth are the same shape, size and form as commonly found on standard combs, which preferably includes a comb with two different sized teeth. The comb preferably has back portion section. However it is contemplated that the comb can have a handle portion as found on standard combs.

Extending from the end teeth 16 of the comb and fixed along the back portion is a groove 20 that can be coupled with various level attachments 28, 34, 40, and 46. Each attachment can be of a varying angle with respect to the central axis of the comb. First level attachment 28, which is shown in detail in FIG. 2A, includes a cylindrical bubble level 31 that is 15° from one side of the central axis. The cylindrical bubble level 31 is placed in first level housing 30, which is coupled to the groove of the comb via the first level attachment engaging portion 32.

Second level attachment 34 which is shown in detail in FIG. 2B, includes a cylindrical bubble level 35 that provides 45° angle from the central axis. The cylindrical bubble level 35 is placed in second level housing 36, which is coupled to the groove of the comb via the second level attachment engaging portion 38.

Figure 2C:
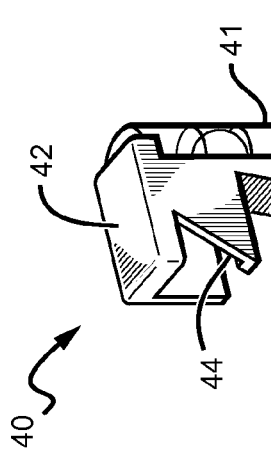

Third level attachment 40 which is shown in detail in FIG. 2C, includes a cylindrical bubble level 41 that provides 90° angle or is perpendicular from the central axis. The cylindrical bubble level 41 is placed in third level housing 42, which is coupled to the groove and the end tooth of the comb via the third level attachment engaging portion 44.

Figure 3:
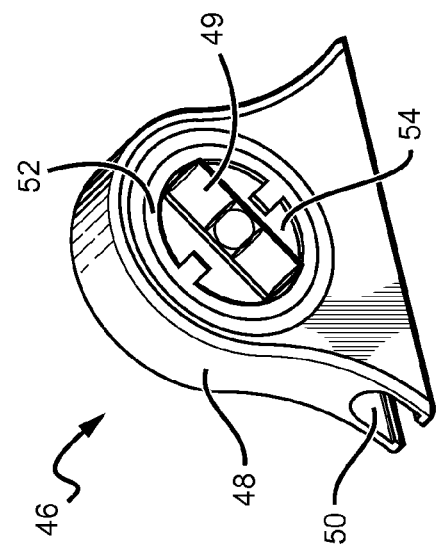
FIG. 3 is a close-up view of an adjustable level attachment.

For flexibility, as shown in detail in FIG. 3, an adjustable level attachment 46 includes a cylindrical bubble level 49 that sits inside an adjustable housing 48 and abuts a dial 52 that is placed in a recess 54 so the cylindrical bubble level 49 can be adjusted to any desired angle. The cylindrical bubble and the dial are placed in adjustable level housing 48, which is coupled to the groove of the comb via the adjustable level attachment engaging portion 50. Preferably the adjustable level attachment can be removed on and off the comb via a coupling mechanism. However, it is contemplated that the adjustable level attachment can be permanently affixed to the comb.

The cylindrical bubble levels can be mounted on the level housing or within the comb in a click-lock arrangement as disclosed in U.S. Pat. No. 4,905,717 to Taylor et al., which is incorporated herein, or other means in which one skilled in the art would do.

An advantage of the present inventive subject matter is to provide different angles for use in a flexible manners. The level attachments can be easily taken on and off in combination along the groove of the comb for any desired combination of angles to facilitate cutting of hair. The groove is a recess in which the level engaging portion can easily be coupled with for use and for change of different angles. FIG. 4 shows a close-up view of the level attachment being coupled to the groove of the comb which works as a recess to allow the level engaging portion to be slide on and off. Accordingly, level attachments may be sold separately for engagement or interfacing with a particular type of comb.

Despite a current preference for a comb to have a groove, it is also contemplated that embodiments of the inventive subject matter could be practiced on any existing combs, as illustrated in one preferred embodiment in FIG. 5. A comb 10 has a back portion 18 but does not have any existing groove or recess. The level attachments, 60, 70 and 80 are then placed on the back portion of the comb via other coupling means, such as an adhesive 90 as shown in a close-up view in FIG. 6. Thus, instead of having an engaging portion to couple with the back portion of the comb, the level attachments have an edge shown in 64, 74 and 84 that an adhesive 90 can be attached to. Adhesive can be any adhesive, such as glue, magnets, double-sided tape or any others that are known to one skilled in the art to couple the attachments to the back portion of the comb. Other preferred coupling mechanism includes having a sleeve (not shown) with grooves that can be placed over an existing comb. While it is preferred to have the level attachments be used with a comb, it is contemplated that an adapter device with a set of level attachments can be used on its own or with other instruments for measuring.

In another preferred embodiment, shown in FIG. 7, a comb 10 has a concave level 100 placed on the back portion 18. The concave level 100 has a concave cylindrical bubble 102 that can be used to measure a particular angle for cutting. For example, when a user wants to cut hair in a particular direction but does not know the angel of such direction, the user can measure the direction using the concave level relative to the central axis to determine the angle of the direction. Once the angle is determined, the user then can find the right level attachments to ensure accuracy in cutting the hair. Preferably, the concave level 100 is fixed within the back portion of the comb. However, it is also contemplated that the concave level 100 can be attached in similar fashions as the adaptable level attachments by engaging a groove of a comb or using an adhesive on existing combs without a groove. It is also contemplated that the concave level can be a convex level relative to the central axis of the comb as shown in FIGS. 8A and 8B.

Any type of bubble or spirit level device capable of indicating the level of a surface between horizontal, vertical or to the nearest degree, may be utilized in connection with the present inventive subject matter. Preferably, the cylindrical bubble levels are placed in the level housing via an adhesive or another other means as appreciated by one ordinary skilled in the art.

It is contemplated that a kit can have a comb with a coupling mechanism to receive the various different level attachments. It is also contemplated that a kit can have just the different level attachments and coupling mechanism to use with existing combs.

The advantages of this system are numerous and enormous. Users not only have a selection of angles to choose from to facilitate or to teach how to cut hair, but the implementation of the level attachment to the comb is simple and effective. Users do not have to worry about the inconvenience of hard to read instructions or cumbersome tools.

It should be apparent, however, to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps could be present, or utilized, or combined with other elements, components, or steps that are not expressly referenced.

What is claimed is:

1. A comb system comprising;
   a comb having a handle portion, a toothed portion, and a central axis;
   wherein the handle portion comprises a first external rectangular groove and a second external rectangular groove disposed on opposing sides of the handle portion;
   a first level attachment comprising a housing having the general shape of a trapezoidal prism coupled with a level;
   wherein the level forms a first angle with respect to the central axis;
   wherein the housing has a channel and first and second flanges extending into the channel;

wherein the first external rectangular groove slidably receives the first flange and the second external rectangular groove slidably receives the second flange; and wherein the channel receives the handle portion such that the first level attachment is removably attached to the handle portion of the comb adjacent to a base of the toothed portion; and an adjustable level attachment having a housing with a channel including third and fourth flanges that extend into the channel, the third and forth flanges being received by the first and second external rectangular grooves, respectively, to mount the housing for removable, sliding movement along the handle portion of the comb adjacent to the base of the toothed portion, the housing also including a bubble level mounted within a movable dial, such that the user may select an angle of the bubble level by moving the dial relative to the housing.

2. The comb system of claim 1, wherein the level comprises a bubble level.

3. The comb system of claim 1, wherein the first angle is 45°.

4. The comb system of claim 1, wherein the first angle is 90°.

5. The comb system of claim 1, wherein the first angle is 15°.

6. The comb system of claim 1 wherein the level is permanently affixed to the housing.

7. The comb system of claim 1 further comprising a scale along the handled portion.

8. The comb system of claim 1 wherein the level comprises a concave level.

9. The comb system of claim 1, further comprising a second level attachment having a level that forms second angle with respect to the central axis, wherein the second angle is different than the first angle.

10. A comb, comprising:
a handle portion having a first side and a second side, the handle portion defining a long axis;
a plurality of regularly-spaced teeth connected to and depending from the handle portion;
first and second grooves inset into the first and second sides of the handle portion, respectively, the first and second grooves being oriented along the long axis of the handle portion generally parallel with one another; and
a first level attachment including
a level housing with a first mounting portion and first and second flange portions that extend inwardly to engage and ride within the respective first and second grooves of the handle portion, such that the first level attachment is removably mounted for sliding movement along the long axis of the handle portion adjacent to a base of the plurality of regularly-spaced teeth with a lower or inner surface of the level housing abutting a top surface of the handle portion, and
a level mounted within the first mounting portion of the level housing so as to make a first predefined angle with respect to the long axis of the handle portion, a geometric shape of the first mounting portion of the level housing defining the first predefined angle, the first predefined angle being greater than 0°; and
a second level attachment including
a second level housing with a second mounting portion and third and fourth flange portions that extend inwardly to engage and ride within the respective first and second grooves of the handle portion, such that the second level attachment is removably mounted for sliding movement along the long axis of the handle portion with a lower or inner surface of the second level housing abutting the to surface of the handle portion adjacent to a base of the plurality of regularly-spaced teeth, and
a second level mounted within the second mounting portion of the second level housing so as to make a second predefined angle with respect to the long axis of the handle portion, a geometric shape of the second mounting portion of the second level housing defining the second predefined angle, the second predefined angle being different than the first predefined angle.

11. The comb of claim 10, wherein the first predefined angle is 45°.

12. The comb of claim 10, wherein the first predefined angle is 90°.

13. The comb of claim 10, wherein the first predefined angle is 15°.

14. The comb of claim 10, further comprising a scale provided on one or both of the first and second sides of the handle portion along the long axis.

15. The comb of claim 14, wherein the scale is positioned between the top surface of the handle portion and a vertical position of the first and second grooves.

16. The comb of claim 10, further comprising a fixed level disposed in the handle portion.

17. The comb of claim 16, wherein the fixed level comprises a bubble level.

18. The comb of claim 16, wherein the fixed level comprises a concave level.

19. The comb of claim 10, further comprising an end level attachment including an end level housing shaped and adapted to engage at least one of the first and second grooves and to bear against an end tooth of the comb, and a third bubble level fixedly mounted in the third level housing such that it is substantially perpendicular to the long axis of the handle portion.

20. The comb of claim 10, wherein the first mounting portion of the level housing has the general shape of a trapezoidal prism.

21. The comb of claim 10, wherein the first and second grooves are generally rectangular.

22. A comb, comprising:
a handle portion having a first side and a second side, the handle portion defining a long axis;
a plurality of regularly-spaced teeth connected to and depending from the handle portion;
first and second grooves inset into the first and second sides of the handle portion, respectively, the first and second grooves being oriented along the long axis of the handle portion generally parallel with one another; and
a first level attachment including
a level housing with first and second flange portions that extend inwardly to engage and ride within the respective first and second grooves of the handle portion, such that the first level attachment is mounted for sliding movement along the long axis of the handle portion with a lower or inner surface of the level housing abutting a top surface of the handle portion, and
a level mounted within the level housing so as to make a first predefined angle with respect to the long axis of the handle portion, the first predefined angle being greater than 0°; and
an end level attachment including an end level housing shaped to engage and engaged in at least one of the first and second grooves and bearing against an end tooth of the comb, and a second bubble level fixedly mounted in the end level housing such that it is substantially perpendicular to the long axis of the handle portion.

23. The comb of claim 22, wherein the level housing further comprises a mounting portion adapted to mount the bubble level, and the first predefined angle is defined by a geometric shape of the mounting portion.

24. The comb of claim 23, wherein the mounting portion has the general shape of a trapezoidal prism.

25. The comb of claim 22, further comprising a scale provided on one or both of the first and second sides of the handle portion along the long axis.

26. The comb of claim 22, further comprising a second third level attachment including
- a third level housing with a third mounting portion and third and fourth flange portions that extend inwardly to engage and ride within the respective first and second grooves of the handle portion, such that the third level attachment is mounted for sliding movement along the long axis of the handle portion with a lower or inner surface of the third level housing abutting the top surface of the handle portion; and
- a third bubble level mounted within the third mounting portion of the third level housing so as to make a second predefined angle with respect to the long axis of the handle portion, a geometric shape of the third mounting portion of the third level housing defining the second predefined angle.

27. The comb of claim 22, further comprising a fixed level disposed in the handle portion.

28. The comb of claim 27, wherein the fixed level comprises a bubble level.

29. The comb of claim 28, wherein the fixed level comprises a concave bubble level.

30. A kit, comprising:
an instrumented comb, including
- a handle portion having a first side and a second side, the handle portion defining a long axis;
- a plurality of regularly-spaced teeth connected to and depending from the handle portion;
- first and second grooves inset into the first and second sides of the handle portion, respectively, the first and second grooves being oriented along the long axis of the handle portion generally parallel with one another;
a first level attachment including
a level housing with a first mounting portion and first and second flange portions that extend inwardly to engage and ride within the respective first and second grooves of the handle portion, such that the first level attachment is removably mounted for sliding movement along the long axis of the handle portion adjacent to a base of the plurality of regularly-spaced teeth with a lower or inner surface of the level housing abutting a top surface of the handle portion, and
a bubble level mounted within the first mounting portion of the level housing so as to make a first predefined angle with respect to the long axis of the handle portion, a geometric shape of the first mounting portion of the level housing defining the first predefined angle, the first predefined angle being greater than 0°; and
a second level attachment including
a second level housing with a second mounting portion and third and fourth flange portions that extend inwardly to engage and ride within the respective first and second grooves of the handle portion, such that the second level attachment is removably mounted for sliding movement along the long axis of the handle portion with a lower or inner surface of the second level housing abutting the top surface of the handle portion adjacent to a base of the plurality of regularly-spaced teeth, and
a second bubble level mounted within the second mounting portion of the second level housing so as to make a second predefined angle with respect to the long axis of the handle portion, a geometric shape of the second mounting portion of the second level housing defining the second predefined angle, the second predefined angle being different than the first predefined angle; and
an instruction booklet describing how to use the instrumented comb and level attachments for cutting hair.

\* \* \* \* \*